US009379959B1

(12) United States Patent
Torvi et al.

(10) Patent No.: US 9,379,959 B1
(45) Date of Patent: Jun. 28, 2016

(54) SYSTEM AND METHOD FOR VERIFYING THE FUNCTIONALITY OF NETWORK PATHS

(71) Applicant: Juniper Networks, Inc., Sunnyvale, CA (US)

(72) Inventors: Raveendra Torvi, Nashua, NH (US); Ravi I Singh, San Jose, CA (US); Harish Sitaraman, Bangalore (IN); Yakov Rekhter, New York, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

(21) Appl. No.: 14/328,669

(22) Filed: Jul. 10, 2014

(51) Int. Cl.
*G06F 15/177* (2006.01)
*G06F 15/173* (2006.01)
*H04L 12/26* (2006.01)
*H04L 12/723* (2013.01)
*H04L 12/701* (2013.01)

(52) U.S. Cl.
CPC ............ *H04L 43/50* (2013.01); *H04L 43/0811* (2013.01); *H04L 45/00* (2013.01); *H04L 45/50* (2013.01)

(58) Field of Classification Search
CPC ...... H04L 45/50; H04L 43/0811; H04L 45/00
USPC .................................................. 709/224, 242
See application file for complete search history.

(56) References Cited

U.S. PATENT DOCUMENTS

| 7,047,315 | B1 * | 5/2006 | Srivastava | H04L 45/50 370/236 |
| 8,374,095 | B2 * | 2/2013 | Boutros | H04L 43/0811 370/248 |
| 2010/0002711 | A1 * | 1/2010 | Aoki | H04L 45/10 370/401 |
| 2011/0142450 | A1 * | 6/2011 | Tanzi | H04J 14/0257 398/79 |
| 2012/0236866 | A1 * | 9/2012 | Endo | H04L 43/0811 370/392 |
| 2012/0281526 | A1 * | 11/2012 | Singamsetty | H04L 43/10 370/225 |

OTHER PUBLICATIONS

Ryan Bickhart, et al; Apparatus, System, and Method for Preventing Unintentional Forwarding Reconfiguration in Network Environments; U.S. Appl. No. 14/503,061, filed Sep. 30, 2014.
Apoorva Jindal, et al.; Systems and Methods for Interfacing Software-Defined Networks With Non-Software-Defined Networks; U.S. Appl. No. 14/231,493, filed Mar. 31, 2014.

* cited by examiner

*Primary Examiner* — Hieu Hoang
(74) *Attorney, Agent, or Firm* — ALG Intellectual Property, LLC

(57) ABSTRACT

The disclosed computer-implemented method for verifying the functionality of network paths may include (1) constructing, at a source node within a network, a test packet that uniquely identifies a network path whose functionality is unverified, (2) sending the test packet to a target node within the network via the network path in an attempt to verify the functionality of the network path, (3) receiving, back from the target node, the test packet sent to the target node via the network path, and then (4) verifying, at the source node, the functionality of the network path based at least in part on the test packet received back from the target node. Various other methods, systems, and computer-readable media are also disclosed.

18 Claims, 6 Drawing Sheets

SYSTEM AND METHOD FOR VERIFYING THE FUNCTIONALITY OF NETWORK PATHS

BACKGROUND

Computer networks often include various paths that facilitate transferring data from one computing device to another. For example, a MultiProtocol Label Switching (MPLS) network may include various paths that facilitate the flow of network traffic between a source device and a destination device. Unfortunately, one or more of these network paths may experience a complication (such as a configuration error and/or a physical failure) that impedes the flow of network traffic between the source device and the destination device.

Traditional path-verification technologies may test the functionality and/or reliability of network paths by sending a test packet from one computing device to another along a specific path and then determining whether the test packet was able to successfully reach its destination along that path. For example, a traditional path-verification technology may send a test packet from a source device to a destination device along a specific path within the data plane of an MPLS network. Upon receiving the test packet from the source device along that path, the destination device may process the test packet by redirecting (sometimes also referred to as "punting") the test packet from the data plane to the control plane. In the event that the control plane recognizes the path, the destination device may create a response packet addressed to the source device and then send the response packet to source device. As the response packet reaches the source device, the traditional path-verification technology may be able to verify the functionality and/or reliability of the path based at least in part on the response packet.

As the size of the MPLS network (and/or the number of network paths) increases, the number of test packets received and/or processed by the destination device may also increase. Unfortunately, the destination device may consume a significant amount of time and/or resources in processing all of these test packets. Accordingly, the instant disclosure identifies and addresses a need for additional and improved systems and methods for verifying the functionality of network paths.

SUMMARY

As will be described in greater detail below, the instant disclosure describes various systems and methods for verifying the functionality of network paths by sending a self-addressed test packet that boomerangs from a source node to a target node and then back to the source node.

In one example, a computer-implemented method for verifying the functionality of network paths may include (1) constructing, at a source node within a network, a test packet that uniquely identifies a network path whose functionality is unverified, (2) sending the test packet to a target node within the network via the network path in an attempt to verify the functionality of the network path, (3) receiving, back from the target node, the test packet sent to the target node via the network path, and then (4) verifying, at the source node, the functionality of the network path based at least in part on the test packet received back from the target node.

In one embodiment, a system for implementing the above-described method may include (1) a construction module, stored in memory, that constructs, at a source node within a network, a test packet that uniquely identifies a network path whose functionality is unverified, (2) a sending module, stored in memory, that sends the test packet to a target node within the network via the network path in an attempt to verify the functionality of the network path, (3) a receiving module, stored in memory, that receives, back from the target node, the test packet sent to the target node via the network path, (4) a verification module, stored in memory, that verifies, at the source node, the functionality of the network path based at least in part on the test packet received back from the target node, and (5) at least one physical processor configured to execute the construction module, the sending module, the receiving module, and the verification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) construct, at a source node within a network, a test packet that uniquely identifies a network path whose functionality is unverified, (2) send the test packet to a target node within the network via the network path in an attempt to verify the functionality of the network path, (3) receive, back from the target node, the test packet sent to the target node via the network path, and then (4) verify, at the source node, the functionality of the network path based at least in part on the test packet received back from the target node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
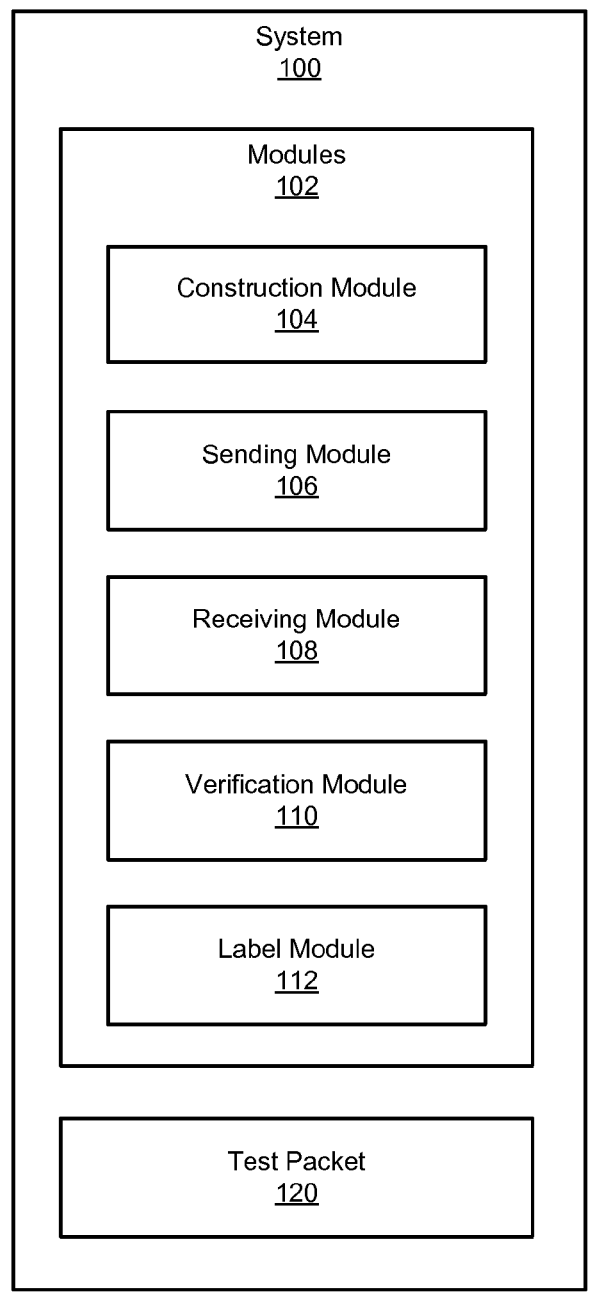
FIG. 1 is a block diagram of an exemplary system for verifying the functionality of network paths.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for verifying the functionality of network paths. As will be explained in greater detail below, embodiments of the instant disclosure may efficiently verify the functionality of network paths by sending a self-addressed test packet that boomerangs from a source node to a target node and then back to the source node. Because the packet is already addressed to the source node, the target node may be able to send the packet back to the source node without performing much processing. For example, a target node may receive a test packet from a source node via a network path within the data plane of an MPLS network. In this example, the target node may send the test packet back to the source node without having to redirect and/or punt the test packet to the control plane of the MPLS network, thereby potentially reducing the amount of time and/or resources consumed by the target node in processing the test packet.

Figure 2:
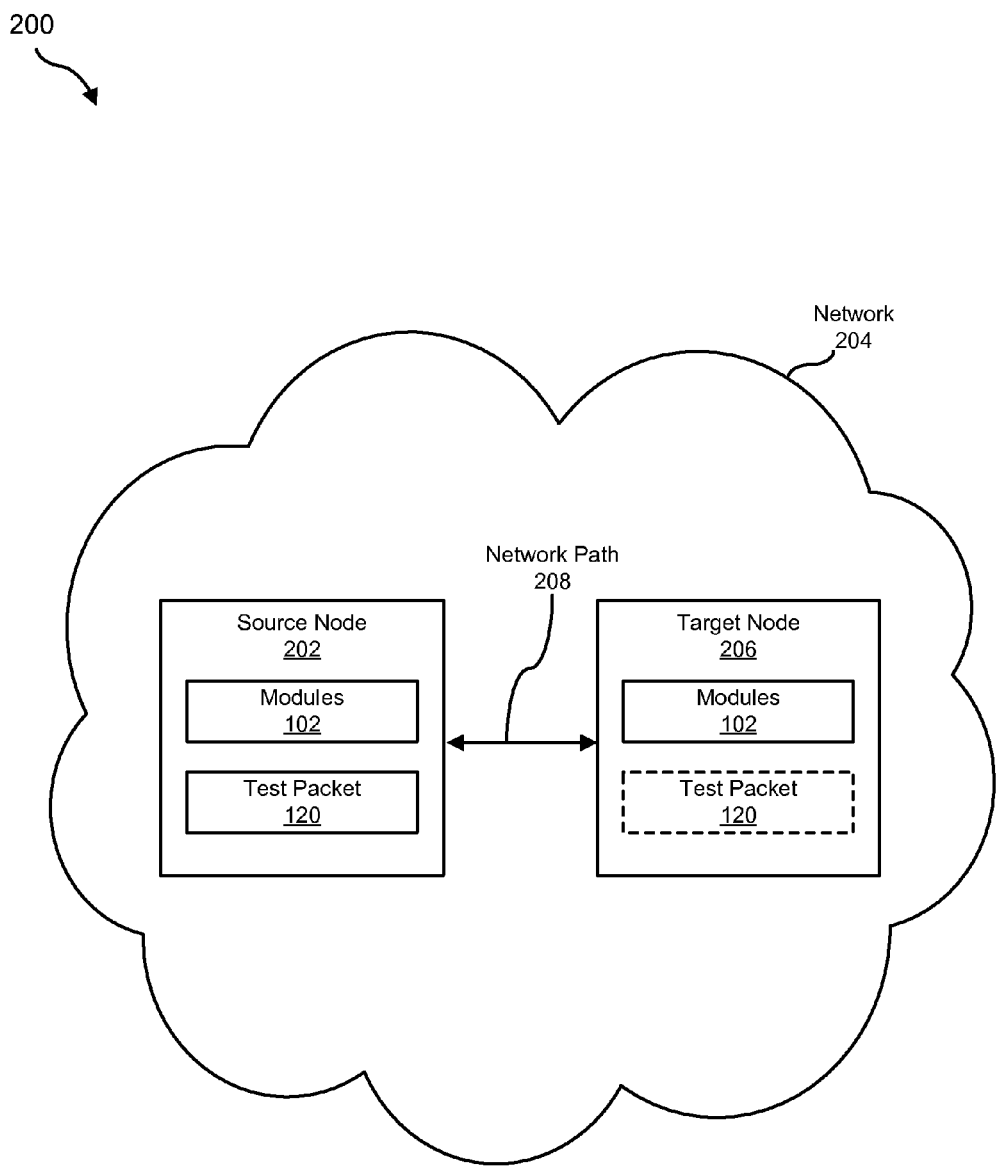
FIG. 2 is a block diagram of an additional exemplary system for verifying the functionality of network paths.
Figure 4:
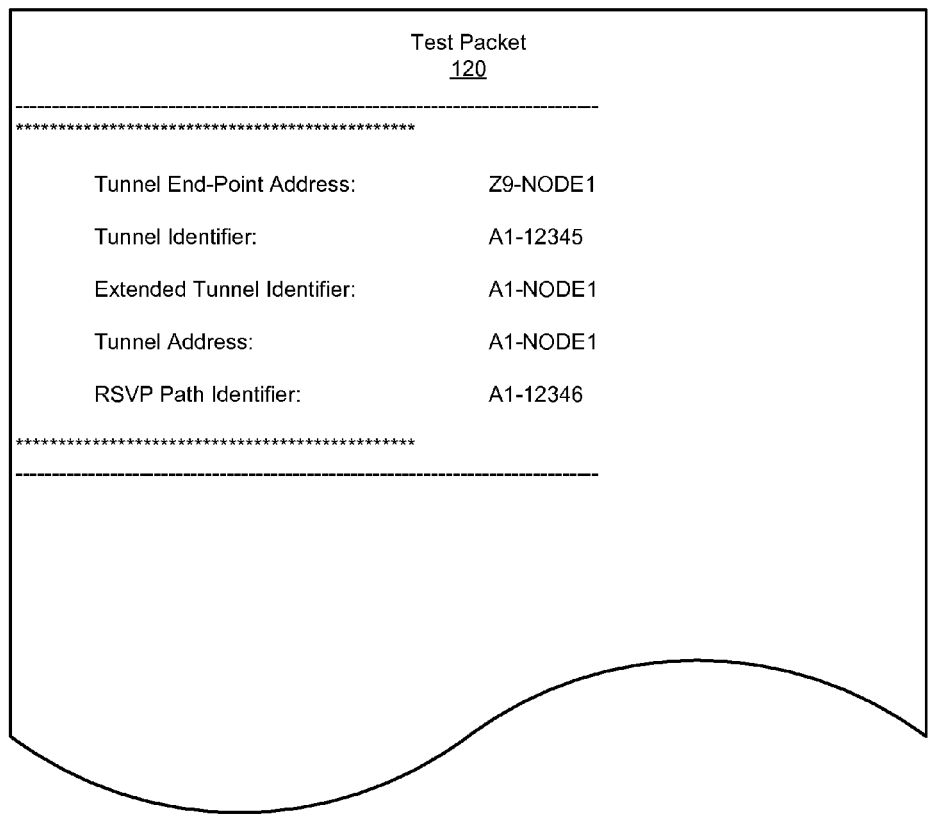
FIG. 4 is an illustration of an exemplary test packet.
Figure 5:
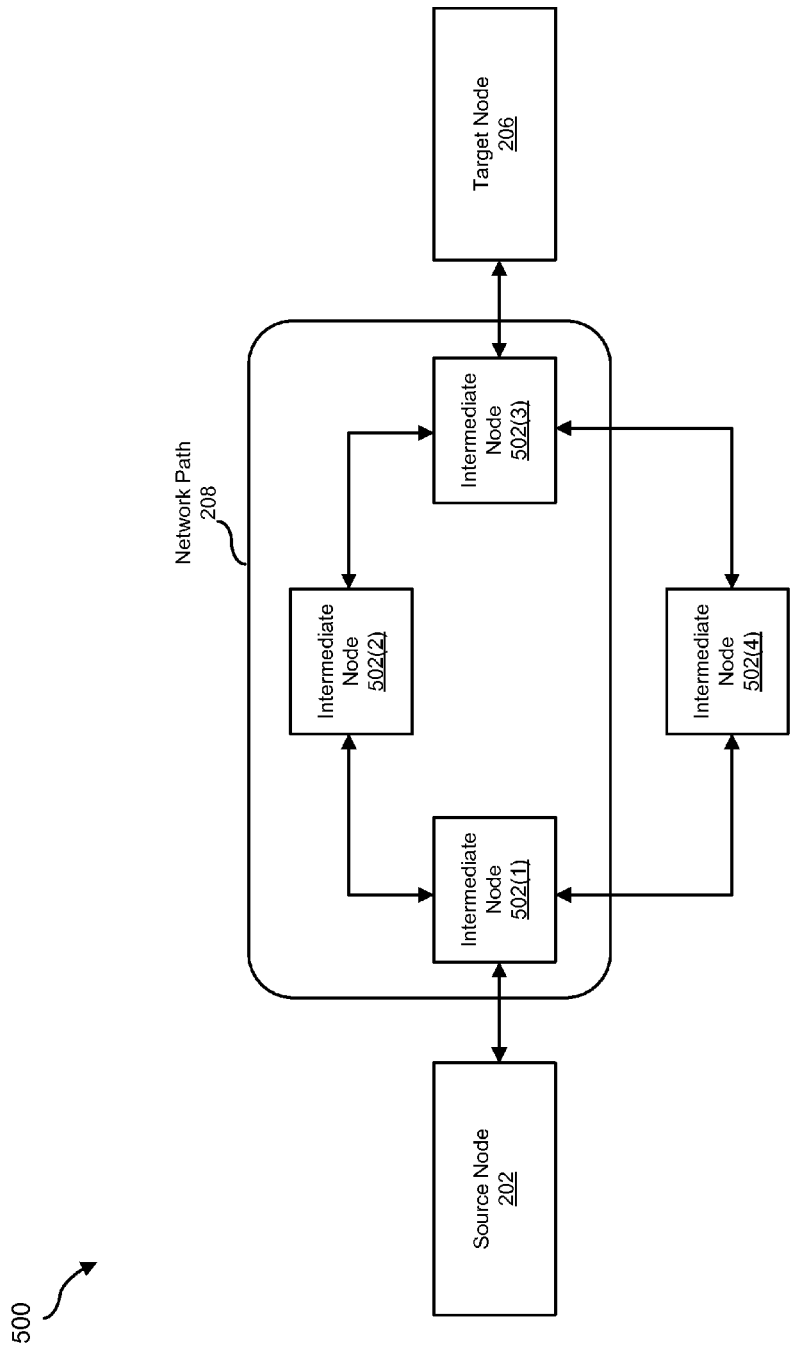
FIG. 5 is a block diagram of an exemplary network that includes network paths.

The following will provide, with reference to FIGS. 1, 2, and 5, detailed descriptions of exemplary systems for verifying the functionality of network paths. Detailed descriptions of corresponding computer-implemented methods will also be provided in connection with FIG. 3. In addition, detailed descriptions of an exemplary test packet will be provided in connection with FIG. 4. Finally, the discussion corresponding to FIG. 6 will provide numerous examples of systems that may include one or more of the components shown in FIGS. 1-5.

FIG. 1 is a block diagram of exemplary system 100 for verifying the functionality of network paths. As illustrated in this figure, exemplary system 100 may include one or more modules 102 for performing one or more tasks. For example, and as will be explained in greater detail below, exemplary system 100 may include a construction module 104 that constructs, at a source node within a network, a test packet that uniquely identifies a network path whose functionality may be unverified. Exemplary system 100 may additionally include a sending module 106 that sends the test packet to a target node within the network via the network path in an attempt to verify the functionality of the network path. Exemplary system 100 may also include a receiving module 108 that receives, back from the target node, the test packet sent to the target node via the network path.

In addition, and as will be described in greater detail below, exemplary system 100 may include a verification module 110 that verifies, at the source node, the functionality of the network path based at least in part on the test packet received back from the target node. Exemplary system 100 may further include a label module 112 that replaces, within the test packet, a label that identifies the target node with another label that directs the test packet back to the source node. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, causes the computing device to perform one or more tasks. For example, and as will be described in greater detail below, one or more of modules 102 may represent software modules stored and configured to run on one or more computing devices, such as the devices illustrated in FIG. 2 (e.g., source node 202 and/or target node 206), the devices illustrated in FIG. 5 (e.g., intermediate nodes 502(1)-(4)), and/or computing system 600 in FIG. 6. One or more of modules 102 in FIG. 1 may also represent all or portions of one or more special-purpose computers configured to perform one or more tasks.

As illustrated in FIG. 1, exemplary system 100 may also include one or packets, such as test packet 120. The term "test packet," as used herein, generally refers to any type or form of package, encapsulation, abstraction, and/or object that includes one or more formatted units of data. In one example, test packet 120 may uniquely identify a network path whose functionality is unverified. In this example, test packet 120 may include a source address and a destination address that match the Internet Protocol (IP) address of a source node. Additionally or alternatively, test packet 120 may include a tunnel identifier, an extended tunnel, a tunnel address, and/or a return path identifier. Examples of test packet 120 include, without limitation, MPLS packets, IP version 4 (IPv4) packets, IP version 6 (IPv6) packets, Gateway-to-Gateway Protocol (GGP) packets, Transmission Control Protocol (TCP) packets, combinations of one or more of the same, or any other suitable packet.

Exemplary system 100 in FIG. 1 may be implemented in a variety of ways. For example, all or a portion of exemplary system 100 may represent portions of exemplary system 200 in FIG. 2. As shown in FIG. 2, system 200 may include a source node 202 in communication with a target node 206 via a network 204. In one example, source node 202 may be programmed with one or more of modules 102. In this example, source node 202 may construct test packet 120 that uniquely identifies a network path 208 in network 204.

Additionally or alternatively, target node 206 may be programmed with one or more of modules 102. In one example, target node 206 may receive test packet 120 from source node 202 via network path 208 in network 204. Target node 206 may then send test packet 120 back to source node 202 via network path 208 or another network path (not illustrated in FIG. 2) in network 204.

In one embodiment, one or more of modules 102 from FIG. 1 may, when executed by at least one processor of source node 202 and/or target node 206, enable source node 202 and/or target node 206 to verify the functionality of network paths. For example, and as will be described in greater detail below, construction module 104 may construct, at a source node 202 within network 204 in FIG. 2, test packet 120 that uniquely identifies a network path 208 whose functionality is unverified. Next, sending module 106 may, at source node 202, send test packet 120 to a target node 206 within network 204 via network path 208 in an attempt to verify the functionality of network path 208. Receiving module 108 may receive, at source node 202, test packet 120 back from target node 206 via network path 208 or another network path (not illustrated in FIG. 2). Finally, verification module 110 may verify, at source node 202, the functionality of network path 208 based at least in part on test packet 120 received back from target node 206.

Source node 202 generally represents any type or form of computing device capable of sending, receiving, directing, and/or routing traffic within a network. Examples of source node 202 include, without limitation, routers (such as ingress, egress, label edge, and/or label switch routers), Broadband Remote Access Servers (BRASes), Broadband Network Gateways (BNGs), switches, network hubs, gateways, network default gateways, nodes, servers, bridges, Field Programmable Gate Arrays (FPGAs), laptops, tablets, desktops, cellular phones, Personal Digital Assistants (PDAs), multimedia players, embedded systems, wearable devices, gaming consoles, exemplary computing system 600 in FIG. 6, portions of one or more of the same, combinations of one or more of the same, or any other suitable source node.

Target node 206 generally represents any type or form of computing device capable of sending, receiving, directing, and/or routing traffic within a network. Examples of target node 206 include, without limitation, routers (such as ingress, egress, and/or label edge routers), BRASes, BNGs, switches, network hubs, gateways, network default gateways, nodes, servers, bridges, FPGAs, laptops, tablets, desktops, cellular phones, PDAs, multimedia players, embedded systems, wearable devices, gaming consoles, exemplary computing system 600 in FIG. 6, portions of one or more of the same, combinations of one or more of the same, or any other suitable target node.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, an MPLS network, an IP network, a software-defined network (such as an OPENFLOW network), a Power Line Communications (PLC) network, a cellular network (e.g., a Global System for Mobile Communications (GSM) network), combinations of one or more of the same, or any other suitable network. Network 204 may facilitate communication or data transfer using wireless or wired connections and/or may support Resource Reservation Protocol (RSVP)-Traffic Engineering (RSVP-TE). In one embodiment, network 204 may facilitate communication between source node 202 and target node 206 via network path 208 and/or one or more other network paths (not illustrated in FIG. 2).

Network path 208 generally represents any type or form of path, link, and/or connection between a source node and a target node within a network. In some examples, network path 208 may include one or more intermediate nodes that separate source node 202 and target node 206. For example, network path 208 may include a series of intermediate nodes that facilitate communication between source node 202 and target node 206 within network 204. In this example, network path 208 may represent a Label-Switched Path (LSP) within the data plane of network 208.

Figure 3:
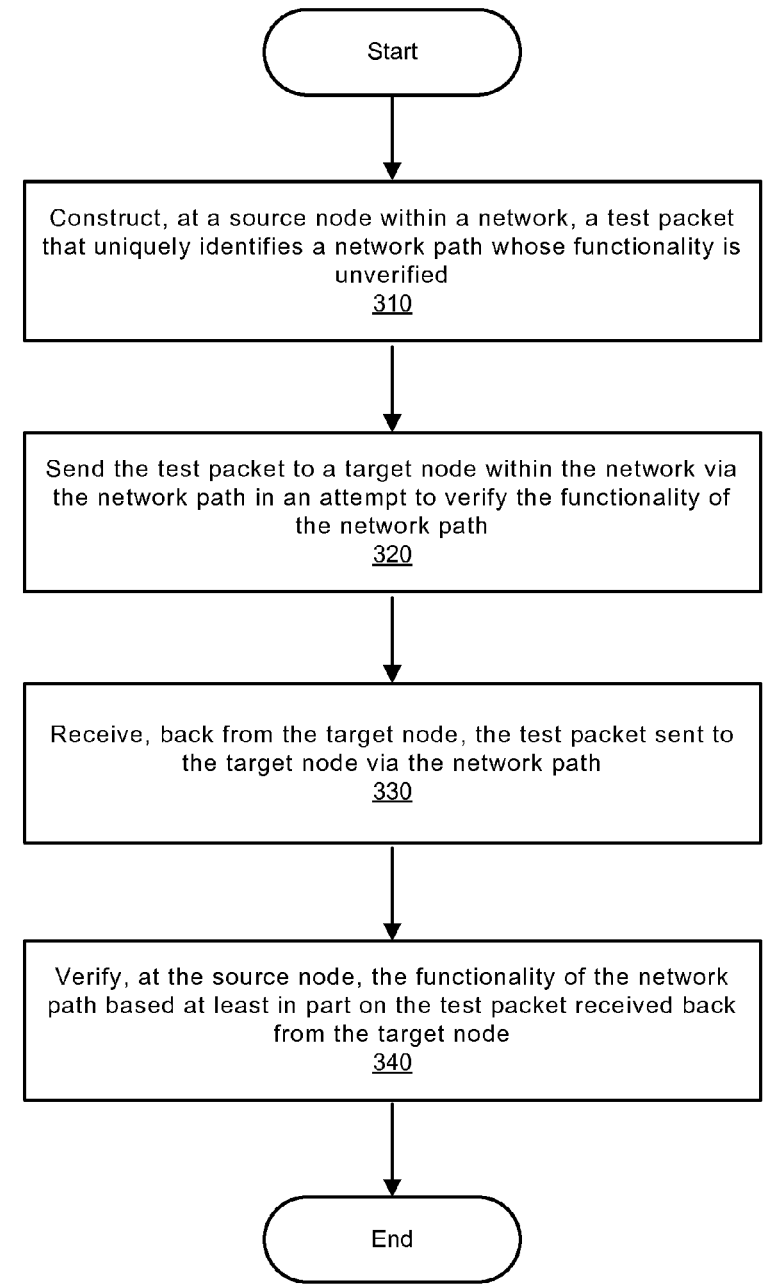
FIG. 3 is a flow diagram of an exemplary method for verifying the functionality of network paths.

FIG. 3 is a flow diagram of an exemplary computer-implemented method 300 for verifying the functionality of network paths. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 600 in FIG. 6.

As illustrated in FIG. 3, at step 310 one or more of the systems described herein may construct, at a source node within a network, a test packet that uniquely identifies a network path whose functionality is unverified. For example, construction module 104 may, as part of source node 202 in FIG. 2 or 5, construct test packet 120 that uniquely identifies network path 208. In this example, the functionality of network path 208 may be unverified.

The term "functionality," as used in this context herein, generally refers to a network path's ability to reliably transport packets from a source node to a target node within a network. The term "unverified," as used in this context herein, generally refers to any type or form of state and/or condition in which a network path has yet to be verified for the first time and/or needs to be re-verified for any reason after having been verified for the first time.

Construction module 104 may construct test packet 120 in a variety of ways and/or contexts. For example, construction module 104 may create a test packet 120. In this example, construction module 104 may identify an IP address of source node 202 and then copy the IP address of source node 202 into a source address of test packet 120 and/or a destination address of test packet 120.

In one example, construction module 104 may construct test packet 120 in FIG. 4 that includes 5-tuple data uniquely identifying network path 208. As illustrated in FIG. 4, test packet 120 may include a tunnel end-point address (in this example, "Z9-NODE1"), a tunnel identifier (in this example, "A1-12345"), an extended tunnel identifier (in this example, "A1-NODE1"), tunnel address (in this example, "A1-NODE1"), and/or an RSVP path identifier (in this example, "A1-123456"). In this example, test packet 120 may represent an MPLS packet.

The term "tunnel," as used herein, generally refers to any type or form of virtualization and/or abstraction of a network path encapsulated by a network and/or tunneling protocol. Examples of such a tunnel include, without limitation, MPLS tunnels, Generic Routing Encapsulation (GRE) tunnels, Label Distribution Protocol (LDP) tunnels, Border Gateway Protocol (BGP) tunnels, BGP Labeled Unicast (BGP-LU) tunnels, combinations of one or more of the same, or any other suitable tunnel.

In some examples, test packet 120 may include a unique identifier for network path 208. For example, the unique identifier may represent an item of information normally stored in the tunnel identifier field of test packet 120. Additionally or alternatively, the unique identifier may include a combination of elements normally stored in the header of test packet 120. As a specific example, a unique identifier for network path 208 may include a combination of the tunnel address and the RSVP path identifier.

In some examples, the unique identifier may represent an item of information normally stored in a standard field of test packet 120. For example, a unique identifier for network path 208 may include the extended tunnel identifier.

Returning to FIG. 3, at step 320 one or more of the systems described herein may send the test packet to a target node within the network via the network path in an attempt to verify the functionality of the network path. For example, sending module 106 may, as part of source node 202 in FIG. 2 or 5, send test packet 120 to target node 206 within network 204 via network path 208 in an attempt to verify the functionality of network path 208.

Sending module 106 may send test packet 120 in a variety of ways and/or contexts. In one example, sending module 106 may send test packet 120 to the next hop or node along network path 208 on the way to target node 206. For example, sending module 106 may send test packet 120 from source node 202 to intermediate node 502(1) in FIG. 5. The term "intermediate node," as used herein, generally refers to any type or form of computing device capable of sending, receiving, directing, and/or routing traffic within a network. Examples of intermediate nodes 502(1)-(4) in FIG. 5 include, without limitation, routers (such as ingress, egress, label edge, and/or label switch routers), BRASes, BNGs, switches, network hubs, gateways, network default gateways, nodes, servers, bridges, FPGAs, laptops, tablets, desktops, cellular phones, PDAs, multimedia players, embedded systems, wearable devices, gaming consoles, exemplary computing system 600 in FIG. 6, portions of one or more of the same, combinations of one or more of the same, or any other suitable source node.

In one example, receiving module 108 may, as part of intermediate node 502(1) in FIG. 5, receive test packet 120 sent from source node 202. In this example, label module 112 may, as part of intermediate node 502(1) in FIG. 5, replace a label that identifies intermediate node 502(1) within test packet 120 with another label that directs test packet 120 to the next hop or node along network path 208 on the way to target node 206. For example, label module 112 may replace a label that identifies intermediate node 502(1) within test packet 120 with another label that identifies intermediate node 502(2) in FIG. 5. Upon replacement of the label with the other label, sending module 106 may, as part of intermediate node 502(1) in FIG. 5, forward test packet 120 to intermediate node 502(2) along network path 208 based at least in part on the other label.

As illustrated in FIG. 5, source node 202 may connect to target node 206 via network path 208. In this example, network path 208 may include intermediate nodes 502(1), 502(2) and/or 502(3) and exclude intermediate node 502(4). Intermediate nodes 502(1), 502(2), and/or 502(3) may represent Label Switch Routers (LSRs) that collectively make up network path 208 within the data plane of network 204.

Accordingly, network path 208 may transport test packet 120 from source node 202 to intermediate node 502(1) to intermediate node 502(2) to intermediate node 502(3) and then to target node 206 within network 204. In one example, test packet 120 may initially include a label addressed to intermediate node 502(1). In this example, intermediate node 502(1) may receive test packet 120 from source node 202 and then replace the initial label with a label addressed to intermediate node 502(2). Intermediate node 502(1) may forward test packet 120 to intermediate node 502(2) along network path 208. Intermediate nodes 502(2) and 502(3) may perform similar processes to facilitate transporting test packet 120 along network path 208 until reaching target node 206 within network 204.

In one example, receiving module 108 may, as part of target node 206 in FIG. 2 or 5, receive test packet 120 sent from source node 202. In this example, label module 112 may, as part of target node 206 in FIG. 2 or 5, replace a label that identifies target node 206 within test packet 120 with another label that directs test packet 120 back to source node 202. For example, label module 112 may decapsulate test packet 120 and then replace a label that identifies intermediate node 502(1) within test packet 120 with another label that identifies intermediate node 502(3) in FIG. 5. Upon replacement of the label with the other label, sending module 106 may, as part of target node 206 in FIG. 2 or 5, forward test packet 120 to intermediate node 502(3) based at least in part on the other label. Intermediate node 502(3) may receive test packet 120 and then forward test packet 120 to either intermediate node 502(2) or intermediate node 502(4) on the way back to source node 202.

Accordingly, target node 206 may send test packet 120 back to source node 202 along a different path than the one being verified. Additionally or alternatively, target node 206 may send test packet 120 back to source node 202 via a different network (not illustrated in FIG. 2) and/or a different protocol.

In one example, label module 112 may determine, at target node 206, that test packet 120 does not include a router alert message. The term "router alert message," as used herein, generally refers to any type or form of alert, message, and/or information indicating that a target node is to redirect and/or punt a test packet from the data plane of a network to the control plane of the network. The term "control plane," as used herein, generally refers to any type or form of routing and/or switching engine that determines and/or decides how to handle the flow of network traffic within a network. In contrast, the term "data plane," as used herein, generally refers to any type or form of routing and/or switching architecture that performs the handling of network traffic as directed by a control plane of a network.

Since, in this example, test packet 120 does not include a router alert message, target node 206 may forgo verification processing of network path 208. For example, target node 206 may decide not to redirect and/or punt test packet 120 to the control plane of network 204. Instead of redirecting and/or punting test packet 120 to the control plane, target node 206 may direct test packet 120 back to source node 202 along the data plane of network 204.

By directing test packet 120 back to source node 202 in this way, target node 206 may facilitate verification processing of network path 208 at source node 202. In other words, by directing test packet 120 back to source node 202 in this way, target node 206 may enable source node 202 to redirect and/or punt test packet 120 to the control plane. In doing so, target node 206 may essentially shift at least a portion of its verification processing burden onto source node 202, thereby potentially reducing the amount of time and/or resources consumed by target node 206 in processing test packet 120. As a result, target node 206 may be able to handle an increased amount of network traffic and/or prevent network slowdown even in the event that various network paths are verified at substantially the same time.

Returning to FIG. 3, at step 330 one or more of the systems described herein may receive, back from the target node, the test packet sent to the target node via the network path. For example, receiving module 108 may, as part of source node 202 in FIG. 2, receive test packet 120 back from target node 206. Accordingly, test packet 120 may essentially boomerang from source node 202 to target node 206 and then back to source node 202.

Receiving module 108 may receive test packet 120 in a variety of ways and/or contexts. For example, receiving module 108 may receive test packet 120 back from target node 206 via network path 208. Additionally or alternatively, receiving module 108 may receive test packet 120 back from target node 206 via another network path (not illustrated in FIG. 2).

Returning to FIG. 3, at step 340 one or more of the systems described herein may verify, at the source node, the functionality of the network path based at least in part on the test packet received back from the target node. For example, verification module 110 may, as part of source node 202 in FIG. 2, verify the functionality of network path 208 based at least in part on test packet 120 received back from target node 206.

Verification module 110 may verify the functionality of network path 208 in a variety of ways and/or contexts. For example, verification module 110 may verify the functionality of network path 208 by determining that test packet 120 has successfully traversed network path 208. Since, in this example, packet 120 was able to successfully traverse network path 208, verification module 110 may determine that network path 208 is functional. In other words, verification module 110 may verify the ability of network path 208 to reliably transport packets from source node 202 to target node 206 within network 204.

In one example, verification module 110 may verify the functionality of network path 208 based at least in part on the identity of test packet 120. For example, verification module 110 may identify the source and destination addresses of test packet 120. In this example, verification module 110 may determine that the source and destination addresses of test packet 120 match the IP address of source node 202. Since, in this example, the source and destination addresses of test packet 120 match the IP address of source node 202, verification module 110 may determine the identity of test packet 120 and/or identify the path-verification nature of test packet 120. Verification module 110 may then verify that network path 208 is functional based at least in part on the identity and/or path-verification nature of test packet 120.

In some examples, verification module 110 may verify the functionality of network path 208 based at least in part on a unique identifier for network path 208 included in test packet 120. For example, verification module 110 may identify a unique identifier for network path 208 within test packet 120. Verification module 110 may then verify that network path 208 is functional based at least in part on the unique identifier for network path 208 identified within test packet 120.

In some examples, verification module 110 may perform verification processing of network path 208 at source node 202. For example, verification module 110 may process test packet 120 by redirecting and/or punting test packet 120 to the control plane of network 204. By redirecting and/or punting test packet 120 to the control plane of network 204, verification module 110 may enable the control plane to add network path 208 to a list of verified network paths capable of facilitating network traffic within network 204. In doing so, verification module 110 may essentially enable target node 206 to forgo such verification processing for network path 208, thereby potentially reducing the amount of time and/or resources consumed by target node 206 in processing test packet 120. As a result, target node 206 may be able to handle an increased amount of network traffic and/or prevent network slowdown even in the event that various network paths are verified at the same time.

Once network path 208 has been verified, the various systems described herein may route network traffic from source node 202 to target node 206 via network path 208. For example, sending module 106 may, as part of source node 202 in FIG. 2, route various data packets to target node 206 via network path 208. Similarly, sending module 106 may, as part of target node 206 in FIG. 2, route various data packets to source node 202 via network path 208.

As explained above in connection with exemplary method 300 in FIG. 3, an ingress router may construct a self-addressed packet that uniquely identifies an LSP within the data plane of an MPLS network. The ingress router may verify the functionality of the LSP by forcing the packet to traverse the LSP until reaching an egress router. Upon receiving this packet, the egress router may decapsulate the packet and/or pop the label of the packet. The egress router may then send the packet back to the ingress router instead of redirecting and/or punting the test packet to the control plane (e.g., the routing engine) of the MPLS network.

Upon receiving the packet back from the egress router, the ingress router may alert the control plane that the LSP traversed by the packet is functional. For example, the ingress router may redirect and/or punt the test packet to the control plane of the MPLS network. The control plane may then add that LSP to a list of verified LSPs within the MPLS network. By verifying the functionality of the LSP in this way, the egress router may potentially reduce the amount of time and/or resources needed to process the packet. As a result, the egress router may be able to handle an increased amount of network traffic and/or prevent network slowdown even in the event that the egress router is verifying various network paths at substantially the same time.

Figure 6:
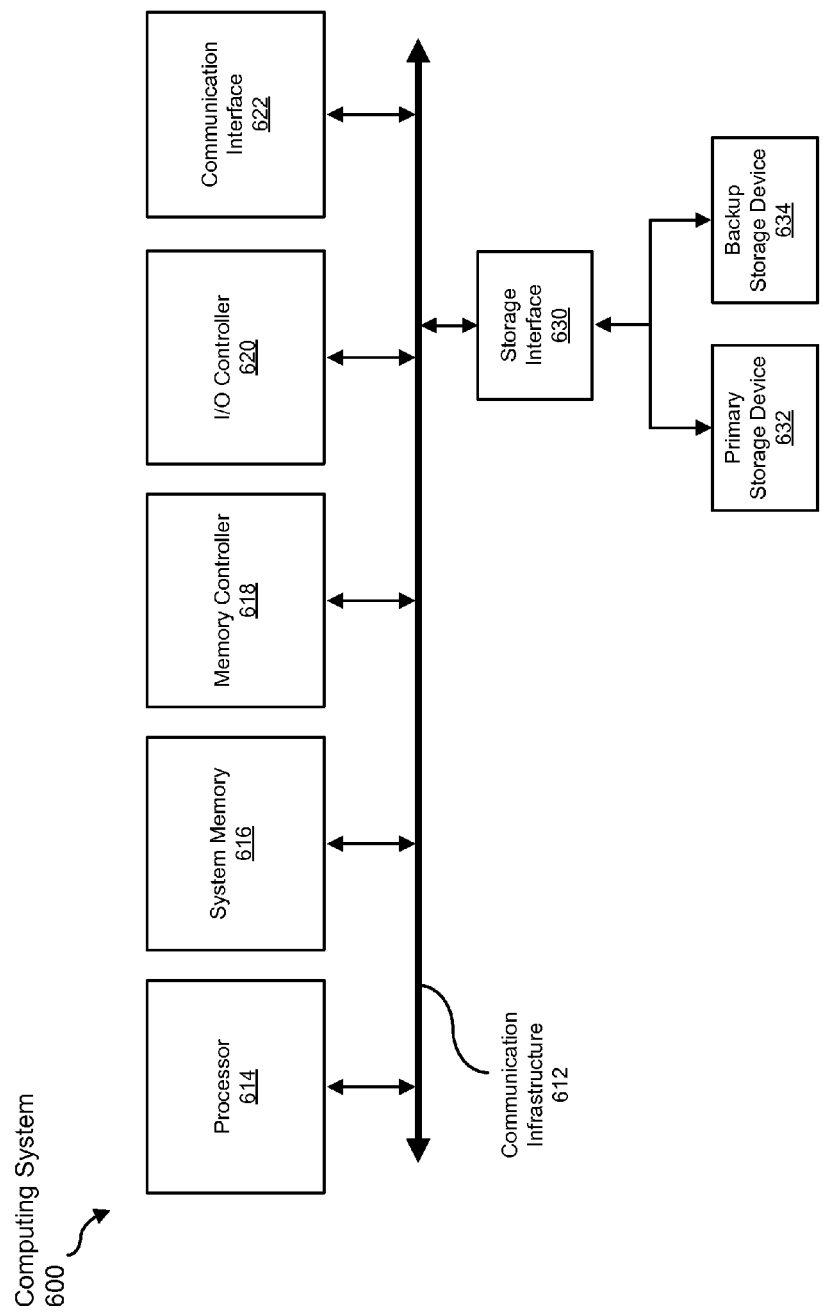
FIG. 6 is a block diagram of an exemplary computing system capable of implementing and/or being used in connection with one or more of the embodiments described and/or or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive network path data to be transformed, transform the network path data, output a result of the transformation to a table, use the result of the transformation to route traffic, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying functionality of network paths, at least a portion of the method being performed by a computing device comprising at least one processor, the method comprising:
    constructing, at a source node within a network, a test packet that uniquely identifies a network path whose functionality of reliably transporting packets from the source node to a target node is unverified, wherein the network path is an Multiprotocol Label Switching (MPLS) path;
    sending the test packet to the target node within the network via the network path to verify the functionality of the network path;
    receiving, back from the target node, the test packet sent to the target node via the network path;
    verifying, at the source node, the functionality of the network path based at least in part on the test packet received back from the target node;
    wherein constructing the test packet comprises:
        identifying an Internet Protocol (IP) address of the source node;
        copying the IP address of the source node into: a source address of the test packet and a destination address of the test packet.

2. The computer-implemented method of claim 1, wherein verifying the functionality of the network path comprises:
    upon receiving the test packet back from the target node, identifying the source and destination addresses of the test packet;
    determining that the source and destination addresses of the test packet match the IP address of the source node;
    verifying the functionality of the network path based at least in part on the source and destination addresses of the test packet matching the IP address of the address of the source node.

3. The computer-implemented method of claim 1, wherein the test packet comprises a unique identifier for the network path.

4. The computer-implemented method of claim 3, wherein verifying the functionality of the network path based at least in part on the test packet comprises:
    upon receiving the test packet back from the target node, identifying the unique identifier for the network path within the test packet;
    verifying the functionality of the network path based at least in part on the unique identifier for the network path identified within the test packet.

5. The computer-implemented method of claim 1, further comprising, upon verifying the functionality of the network path, routing traffic to the target node via the verified network path.

6. The computer-implemented method of claim 1, further comprising:
    receiving, at the target node, the test packet sent from the source node;
    replacing, within the test packet, a label that identifies the target node with another label that directs the test packet back to the source node;
    sending the test packet back to the source node based at least in part on the other label.

7. The computer-implemented method of claim 6, wherein replacing the label that identifies the target node with the other label comprises:
    determining, at the target node, that the test packet does not include a router alert message;
    in response to determining that the test packet does not include a router alert message:
        forgoing, at the target node, verification processing of the network path based at least in part on the test packet;
        directing the test packet back to the source node to facilitate verification processing of the network path at the source node.

8. The computer-implemented method of claim 1, further comprising:
  receiving, at an intermediate node on the network path, the test packet sent from the source node;
  replacing, within the test packet, a label that identifies the intermediate node with another label that directs the test packet to the next node in the network path;
  forwarding the test packet to the next node in the network path based at least in part on the other label.

9. The computer-implemented method of claim 1, wherein verifying the network path comprises:
  processing, at the source node, the test packet received back from the target node;
  adding the network path to a list of verified network paths capable of facilitating network traffic within the network.

10. The computer-implemented method of claim 1, wherein:
  the network comprises a multiprotocol label switching network;
  the network path comprises a label-switched path.

11. A system for verifying the functionality of network paths, the system comprising:
  a processor for executing computer instructions modules stored in a memory, the computer instructions modules comprising:
  a construction module that constructs, at a source node within a network, a test packet that uniquely identifies a network path whose functionality of reliably transporting packets from the source node to a target node is unverified, wherein the network path is an Multiprotocol Label Switching (MPLS) path;
  a sending module that sends the test packet to the target node within the network via the network path to verify the functionality of the network path;
  a receiving module that receives, back from the target node, the test packet sent to the target node via the network path; and
  a verification module that verifies, at the source node, the functionality of the network path based at least in part on the test packet received back from the target node;
  wherein the construction module constructs the test packet by:
    identifying an IP address of the source node;
    copying the IP address of the source node into: a source address of the test packet and a destination address of the test packet.

12. The system of claim 11, wherein the verification module verifies the functionality of the network path by:
  upon receiving the test packet back from the target node, identifying the source and destination addresses of test packet;
  determining that the source and destination addresses of the test packet match the IP address of the source node;
  verifying the functionality of the network path based at least in part on the source and destination addresses of the test packet matching the IP address of the address of the source node.

13. The system of claim 11, wherein the test packet comprises a unique identifier for the network path.

14. The system of claim 13, wherein the verification module verifies the functionality of the network path based at least in part on the test packet by:
  upon receiving the test packet back from the target node, identifying the unique identifier for the network path within the test packet;
  verifying the functionality of the network path based at least in part on the unique identifier for the network path identified within the test packet.

15. The system of claim 11, further comprising, upon verifying the functionality of the network path, routing traffic to the target node via the verified network path.

16. The system of claim 11, further comprising:
  an additional receiving module, stored in memory, that receives, at the target node, the test packet sent from the source node;
  a label module, stored in memory, that replaces, within the test packet, a label that identifies the target node with another label that directs the test packet back to the source node;
  an additional sending module, stored in memory, that sends the test packet back to the source node based at least in part on the other label.

17. The system of claim 16, wherein the label module replaces the label that identifies the target node with the other label by:
  determining, at the target node, that the test packet does not include a router alert message;
  in response to determining that the test packet does not include a router alert message:
    forgoing, at the target node, verification processing of the network path based at least in part on the test packet;
    directing the test packet back to the source node to facilitate verification processing of the network path at the source node.

18. A non-transitory computer-readable medium comprising one or more computer-readable instructions that, when executed by at least one processor of a computing device, cause the computing device to:
  construct, at a source node within a network, a test packet that uniquely identifies a network path whose functionality of reliably transporting packets from the source node to a target node is unverified, wherein the network path is an Multiprotocol Label Switching (MPLS) path;
  send the test packet to the target node within the network via the network path to verify the functionality of the network path;
  receive, back from the target node, the test packet sent to the target node via the network path;
  verify, at the source node, the functionality of the network path based at least in part on the test packet received back from the target node;
  wherein the computing device constructs the test packet by:
    identifying an Internet Protocol (IP) address of the source node;
    copying the IP address of the source node into: a source address of the test packet and a destination address of the test packet.

* * * * *